Nov. 17, 1936.   T. SCHOU   2,061,388
INSULATING ELECTRICAL COIL WINDING
Filed Oct. 27, 1933
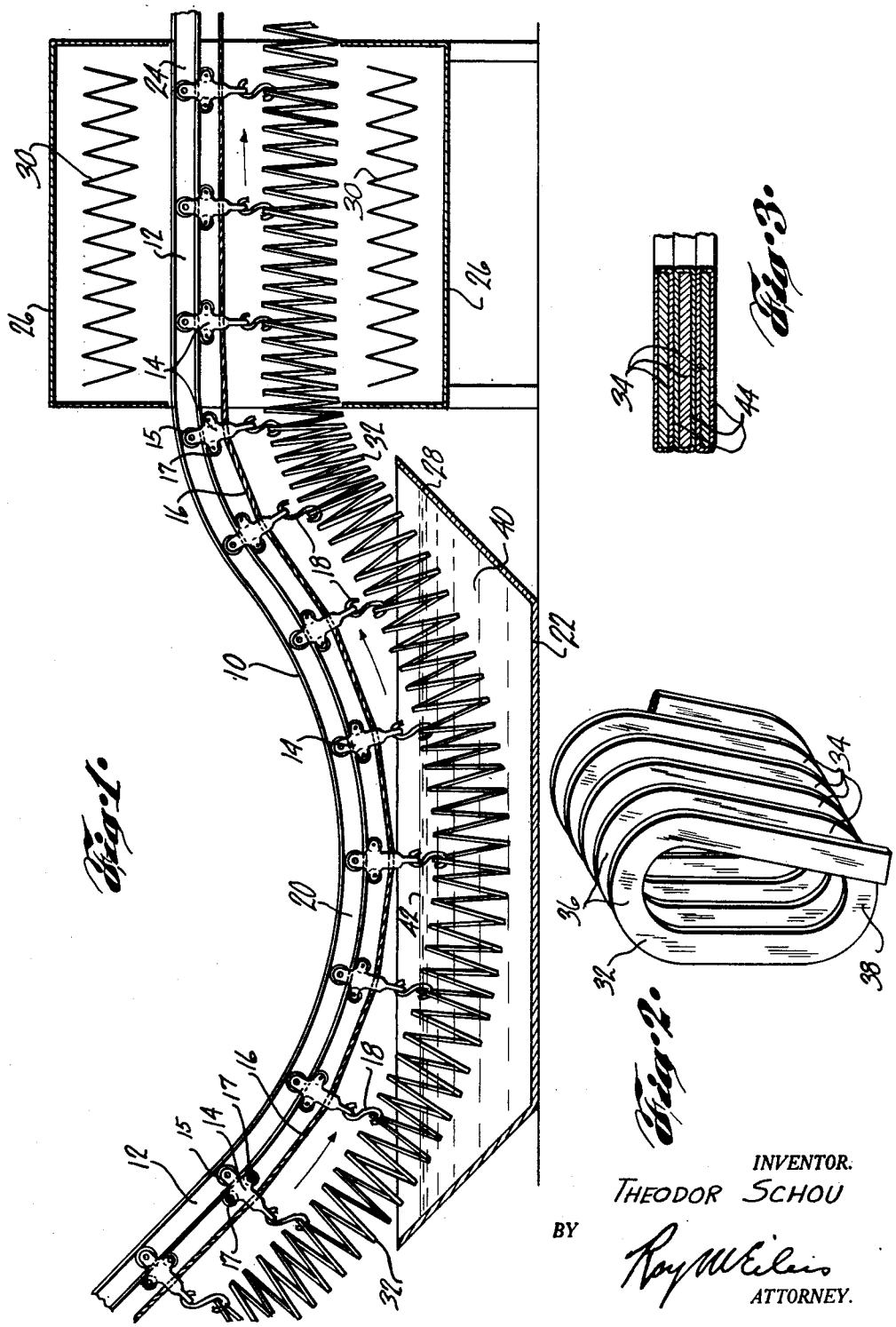
INVENTOR.
THEODOR SCHOU
BY
Roy M Eilers
ATTORNEY.

Patented Nov. 17, 1936

2,061,388

UNITED STATES PATENT OFFICE 2,061,388

INSULATING ELECTRICAL COIL WINDING

Theodor Schou, Beloit, Wis., assignor to Fairbanks, Morse & Co., Chicago, Ill., a corporation of Illinois Application October 27, 1933, Serial No. 695,382

3 Claims. (Cl. 91—70)

This invention relates to improvements in insulating electrical coil windings, and more particularly to an improved method and apparatus for insulating armature and field coils of electric machines, especially those coils and windings which are formed from ribbon or strap conductor material, wound on edge.

The conventional method of insulating edge-wound strap coils of a field winding for an electrical machine, consists in inserting washers of horn fibre, asbestos, or other insulating material between adjacent turns of the coil winding, and in assembling the insulated winding on a field pole where it is temporarily clamped in place while the edges of the insulating washers are removed, as by burning with an acetylene torch, or other like device. The assembled pole and winding is then immersed in a bath containing a binding varnish or other similar liquid, and finally, is baked dry in an oven. The foregoing process is generally manually executed, and results in a slow and tedious job, and is very wasteful of material. It is an object of the present invention then, to eliminate the above noted disadvantages, and to provide a more thorough and economical method for effectively insulating the coil windings of electrical machines, particularly the field coils therefor.

Another object is attained in the provision of an improved method of insulating coil windings, wherein the winding is conveyed through a bath of insulating liquid such as a phenolic resin varnish, and then baked dry in a suitable oven.

A further object is attained in the provision of an improved method for insulating coil windings for electrical machines, which consists in drawing an uncoated winding through a bath of a phenolic resin varnish, which, when properly baked on the winding, results in a material characterized by a high dielectric strength and is substantially impervious to, and unaffected by heat, moisture, acids or gases.

Yet another object is to provide an improved method of insulating coil windings, which consists in drawing, at a predetermined constant linear speed, the uncoated winding metal through a bath of phenolic resin varnish of a predetermined specific gravity, and thence through a baking oven which is maintained at a predetermined constant temperature.

A still further object is attained by this invention, providing an improved method of insulating coil windings for electrical machines, in a reduction in the space requirement for the insulation, in the slots of a machine. Due to the reduction in such space requirement according to the improved practice presently described, there results an increase in the capacity of machines of given frame sizes, besides facilitating the manufacture of the coils and their installation. While applicable to electrical machines generally of both alternating current and direct current types, this advantage is particularly reflected in a substantial reduction of production cost of armature coils of direct current machines, being of noted advantage in slow speed low voltage types of direct current equipment.

Other objects and advantages will appear from the following detailed description, and from the drawing, in which:

Fig. 1 is a side elevation, partly in section, of a preferred arrangement of apparatus for coating electrical conductors with an insulating material; Fig. 2 is an enlarged perspective view of a portion of a preferred form of an uncoated edge-wound strap coil winding, and Fig. 3 is an enlarged fragmentary sectional elevation of one side of a coil of the insulated winding, showing the disposition of the layers of insulation in assembled position.

Referring now to the drawing by numerals of reference, 10 indicates, generally, a portion of a preferred form of conveyor which includes a conveyor rail or track 12, and a plurality of equally spaced trolley members 14 provided with load-supporting rollers 15, the trolleys being secured to a conveyor cable 16 which is suitably connected to a power actuated reel or the like, (not shown), preferably of variable speed type. Each of the trolley members 14 is, by preference, provided with a pair of guide rollers 17, which are arranged to engage the under surface of the track 12, to maintain the trolley member perpendicular to the track, for a purpose hereinafter appearing. A load engaging hook 18 is pivotally carried by the lower end of each trolley member 14. The conveyor track 12 is preferably curved downwardly over a portion 20 of its length, such curved portion being disposed directly above a tank or receptacle 22. A horizontally disposed straightaway section 24 of the conveyor track extends through a baking oven 26 arranged adjacent end 28 of the tank 22. The oven 26 is, by preference, mounted with its major axis in a horizontal plane, and is suitably insulated so as to prevent loss of heat. Heat is preferably supplied by means of electrical resistance coils 30 which are connected to a suitable source of power (not shown). This oven is, by preference, provided with any suitable or constant thermostatic control (not shown) for maintaining a substantially constant oven temperature, as predetermined. The direction of conveyor travel is indicated by the arrow in Fig. 1.

In Fig. 2 there is illustrated a preferred form of coil winding 32 which is particularly well adapted to the herein described method of insulating electrical conductors. This coil is, by preference, formed of a continuous strap or ribbon conductor of aluminum, copper, or any other suitable conducting material. The coil 32 may be formed in any suitable coil winding machine (not shown) which is adapted to wind the strap conductor on edge, the coil being composed of a plurality of coil turns 34, each turn of which is provided with oppositely disposed loop portions 36 and 38. Preparatory to coating the winding, the uncoated edge-wound coil is suspended from the trolley hooks 18 so that each hook engages one of the loop portions 36 or 38 of a coil turn 34, preferably so that an equal number of coil turns will be disposed between adjacent hooks. In the example illustrated, five of the coil turns 34 are, by preference, disposed between adjacent hooks. Such suspension of the coil winding effects a spreading of the coil turns for a purpose hereinafter appearing. By way of preparing the coil winding for the coating treatment, the uncoated coil may be conveyed through a suitable bath (not shown) containing a suitable cleaning fluid such as alcohol or the like, for removing grease, oils, or other foreign matter from the uncoated metal. The uncoated coil stock is then conveyed through the tank 22 which contains a liquid insulating varnish 40, the varnish filling the tank to a level indicated at 42, so as completely to immerse and hence cover all portions of the winding coil passing through the bath. The insulating varnish employed in the present process is preferably a phenol resin varnish, for example, a bakelite varnish. A varnish suitable to the present purpose consists of a synthetic resin, such as a phenol-formaldehyde condensation product, in a suitable liquid vehicle consisting of any of the known solvents such that, after baking, there remains on the coated winding surface, an even film of phenolic resin. This phenolic resin, being initially in liquid form, may, if necessary, be mixed with a suitable thinner to bring the resultant mixture to a predetermined specific gravity which, of course, depends upon the particular type of varnish employed.

The coated winding is then passed through the oven 26 where the phenolic resin film is baked on at a predetermined temperature of from 400° to 600° F., for a predetermined period of time, depending upon the type of varnish employed. It has been found from experience, that metallic conductors cannot be properly coated with a baked-on dielectric of older types, such as an ordinary baking varnish. The older prevailing methods, which employed baking varnishes, were unsuccessful from a practical viewpoint, because the baked-on varnish film was uneven in thickness, and too brittle, and required an excessively thick film to obtain proper dielectrical strength. In the present preferred process, an uncoated coil winding is drawn at a predetermined constant linear speed, through a bath of a phenolic resin varnish possessing desirable physical and electrical characteristics. From the bath, the coated coil passes through a baking oven which is automatically controlled to maintain a predetermined constant temperature for hardening the film of phenol resin which adheres to the coil. It has been found that it is absolutely necessary to coordinate and control, within limits, the specific gravity of the liquid insulating material, the baking temperature of the oven, and the linear speed of conveyor travel as the winding is conducted through the liquid and oven. The hardened film of phenol resin baked upon the winding turns by the method herein described, is flexible and substantially impervious to moisture, heat, acids and gases.

By way of illustrating one of the many proven practices of the method and process herein described, an example may be noted, in which the specific gravity of the phenol formaldehyde liquid is substantially .85 at 75° F., a suitable corresponding oven temperature being 400° F., and the time of baking the coil stock substantially 15 minutes at this temperature, as determined by the speed of the conveyor 10, and the effective length of the heating zone through which the conveyor passes. In present production the coated metal stock is carried at a speed of 12 inches per minute through a baking oven or zone whose effective length is 15 feet. These conditions have been found to result in a film of high dielectric strength, and of a thickness ranging between .75 and 1.50 thousandths of an inch, on each side of the ribbon or strap stock constituting the conducting metal of the coil.

It has been found from experience that, other conditions being constant, the thickness of the film is dependent upon the specific gravity of the mixture and likewise upon the speed of movement of the coil through the resin. For example, with a liquid resin of a given gravity, the greater the rate of coil movement, the thicker is the film that adheres to the coil. Therefore, for a desired thickness of film on the conductor, it is necessary to maintain a predetermined constant specific gravity and a predetermined definite linear speed of conveyor travel. The optimum condition for any particular uniform grade of phenol resin varnish may be determined by experiment, and conditions thus established may be subsequently utilized for further runs with an assurance of a product of predetermined characteristics. With the proper conditions determined, it is found that the film of phenol resin is closely bound to the metallic conductor and that a hard, flexible, non-tacky surface results. The insulated coating thus formed on the conductor is characterized by a coefficient of expansion substantially the same as that of the winding conductor, and is evenly distributed and provides insulation for the coil winding which equals any of the more common insulating materials commercially classified as "Class B" insulation. Among such materials are asbestos and the better grades of mica.

It has been found from experience that it is advisable to suspend the coil on the trolley hooks 18 so that an equal number of coil turns 34 are disposed between adjacent hooks. By this provision, the turns are spread sufficiently so as to permit the resinous liquid in the tank 22, to reach and coat all of the exposed surfaces of the metallic conductor. The spreading of the coil turns is made possible by the perpendicular relation existing between the trolley numbers 14 and the track 12. It will be observed from Fig. 1 that the spreading of the coil turns is accentuated as the coil winding is conveyed along the curved portion 20 of the track 12, since the distance between the points of coil suspension is increased as the curved rail portion is traversed.

It will be observed from Fig. 3 that the coil turns 34 are evenly coated with a baked-on film 44 on all its surfaces, and that when the coil turns are compressed, as when assembled, double thicknesses of insulation are present between overlying turns, which increase the dielectric strength between adjacent layers of metal.

In some cases it is desirable to increase the dielectric strength of the coating by applying an additional coating or coatings, to the first coating, since the dielectric strength of a given insulating material is, in part, dependent upon the thickness of such material. Such additional coats may be applied by repeating the above described process, in which case the coil winding may be reversed, end for end, on the hooks to insure a thorough deposit of the phenol resin film over the entire surface of the conductor. It will, of course, be understood that for multiple coating of the conductor, the several units or assemblies, say as shown by Fig. 1, may be duplicated and arranged in series, so that the conveyor may travel from one group of apparatus to the other thereof.

The presently described method of insulating coil windings with a phenolic resin varnish, provides a great saving in material and labor costs, and results in a uniformly insulated winding. The present process may be applied not only to continuous windings for field coils, but equally as well to the edge-wound strap coils of armature windings for direct current machines, and to many other forms of windings, for both alternating and direct current apparatus. The present form of insulation also provides an insulated coil winding which occupies less slot space in the case of armature windings, and less field pole space in the case of field windings. Hence, armature and field losses may be considerably reduced, and the capacity and efficiency of present machines, of any given frame size, materially increased.

It will, of course, be understood that the described method for coating metallic conductors, and the several steps detailed as parts of the process, are selected merely to illustrate preferred practices and embodiments of the present invention, as applied to improved coil winding construction, and that substantial changes may be made in the process, the coating material as well as the material coated, and the manner of employing the same for use, without departing from the spirit and full intended scope of the invention.

I claim as my invention:

1. The herein described method of coating an edge-wound strap coil winding with a heat hardening phenolic resinous dielectric, which consists in arranging the winding in helical form, in spreading the coil turns of said winding so as to expose all surfaces of the turns, in immersing said winding in a bath of the liquid dielectric material by movement of the turns into and out of the bath, in directing the winding through a heating zone and maintaining the coil turns in spaced relation while in said zone, and there subjecting the coated winding to a predetermined hardening temperature for a predetermined period of time, and in moving the said winding continuously, at a substantially constant linear rate, through said bath and through said zone.

2. The herein described method of coating an edge-wound strap coil winding with a heat hardened dielectric, which consists in suspending the coil winding from a conveyor and so arranging the coils thereon as to space each turn from the adjacent turns and distribute an equal number of coil turns between the points of suspension, in immersing said winding in a bath of a liquid phenolic resinous material by presenting the turns to, and removing them from the liquid, in varying the spacing between turns as the winding is moved along the bath, so as to assure a complete coating of all surfaces of the coil turns, conveying the winding through a heating zone while maintaining the coil turns in spaced relation, and there subjecting the coated winding to a predetermined hardening temperature for a predetermined period of time, and in moving the said winding continuously, at a substantially constant linear rate, through said bath and through said zone.

3. The herein described method of insulating a strap-form conductor which consists in arranging the material in the form of an open helix with its turns spaced sufficiently to expose all surfaces of the turns, in continuously advancing the helical unit into and through a bath of liquid phenolic resinous dielectric, thence into and through a baking zone, in immersing and thereafter removing that portion of the helix presented to the bath, in varying the spacing of the turns in the bath as the conductor proceeds therethrough, and in maintaining an appreciable but constant spacing of the turns as the conductor is moved through the baking zone.

THEODOR SCHOU.